United States Patent [19]

van der Lely et al.

[11] 4,152,993
[45] May 8, 1979

[54] IMPLEMENT COMBINATIONS

[75] Inventors: Ary van der Lely, Maasland; Cornelis J. G. Bom, Rozenburg, both of Netherlands

[73] Assignee: C. van der Lely N. V., Maasland, Netherlands

[21] Appl. No.: 827,437

[22] Filed: Aug. 24, 1977

[30] Foreign Application Priority Data

Aug. 30, 1976 [NL] Netherlands ............... 7609603

[51] Int. Cl.² ............................................. A01C 7/00
[52] U.S. Cl. ....................................... 111/8; 111/52; 111/73; 111/85; 172/68; 172/112; 172/123
[58] Field of Search .............. 111/1, 8, 9, 10, 36, 111/84, 85, 86, 52, 73, 61, 34; 172/112, 123, 47, 71, 68, 32, 39, 119, 117, 80, 78, 52, 94, 95, 747, 104, 105, 106; 188/7, 6, 5; 74/13, 14, 15, 11, 12; 180/53 WA

[56] References Cited

U.S. PATENT DOCUMENTS

| | | | |
|---|---|---|---|
| 276,388 | 4/1883 | Gehrke | 111/34 |
| 310,584 | 1/1885 | Hamilton | 111/85 |
| 2,636,459 | 4/1953 | Graves | 111/36 X |
| 3,126,969 | 3/1964 | Sewell | 172/747 X |
| 3,347,188 | 10/1967 | Richey | 172/112 X |
| 3,563,191 | 2/1971 | Yovanovich et al. | 172/32 X |
| 3,610,185 | 10/1971 | Scarborough | 111/85 X |

FOREIGN PATENT DOCUMENTS

| | | | |
|---|---|---|---|
| 2519209 | 11/1975 | Fed. Rep. of Germany | 111/8 |
| 2291693 | 6/1976 | France | 172/32 |
| 7104078 | 9/1972 | Netherlands | 111/85 |
| 388683 | 6/1965 | Switzerland | 111/8 |
| 810744 | 3/1959 | United Kingdom | 111/36 |
| 1314829 | 4/1973 | United Kingdom | 111/10 |

*Primary Examiner*—Edgar S. Burr
*Assistant Examiner*—James R. Feyrer
*Attorney, Agent, or Firm*—William B. Mason; Penrose Lucas Albright

[57] ABSTRACT

A cultivator-material dispensing combination includes a soil-working member that rotates about a horizontal axis forwardly, relative to the direction of travel, to displace soil over the top of that member to a screening at the rear thereof. A seed dispensing hopper has conduits that are supported on a hood that overlies the member and extends to the rear thereof. Material is metered from the hopper through outlets at the conduits' lower rear sides. Drive to the hopper is via a one-way transmission that is driven by a rear roller only when the combination moves forwardly. A further roller can be positioned to the rear of the first mentioned roller and a fertilizer hopper feed also driven to dispense material to the worked soil.

12 Claims, 3 Drawing Figures

IMPLEMENT COMBINATIONS

According to one aspect of the invention, there is provided an implement combination of the kind set forth, wherein mechanism is provided which substantially prevents displacement of the combination rearwardly of its intended direction of operative travel in response to rotation of the soil working member when the latter is in contact with the ground.

Figure 1:
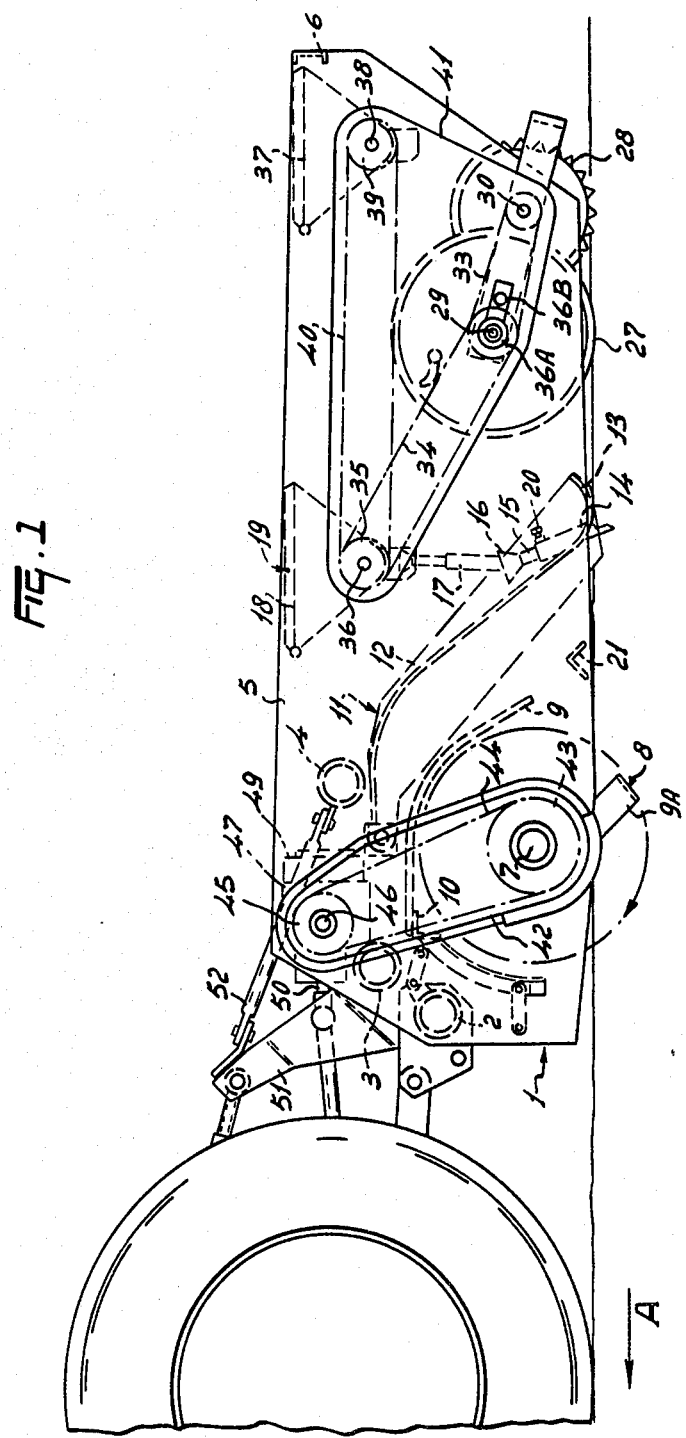
Figure 2:
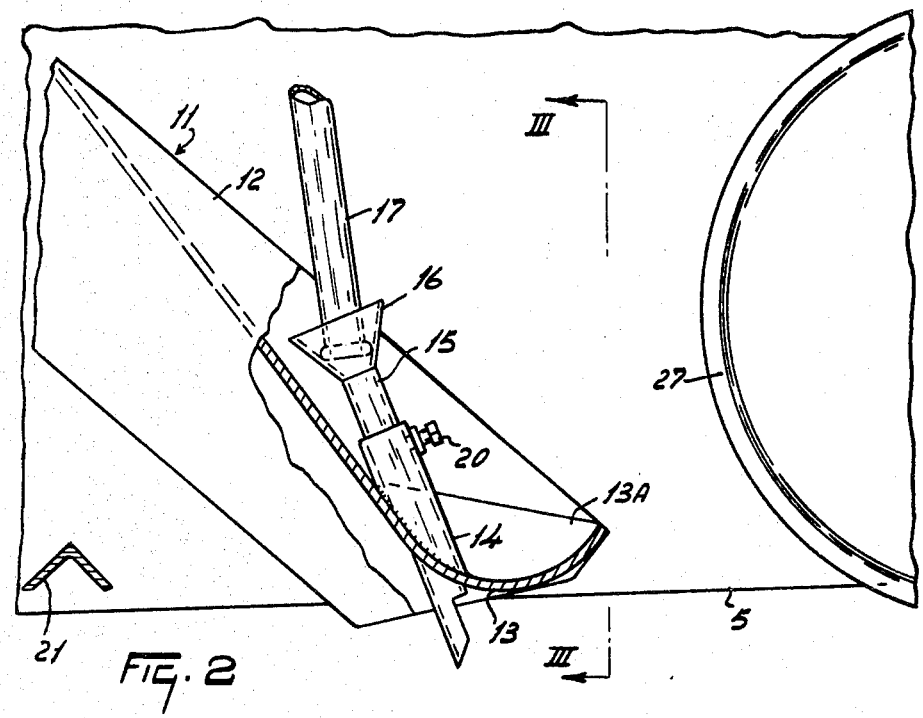
Figure 3:
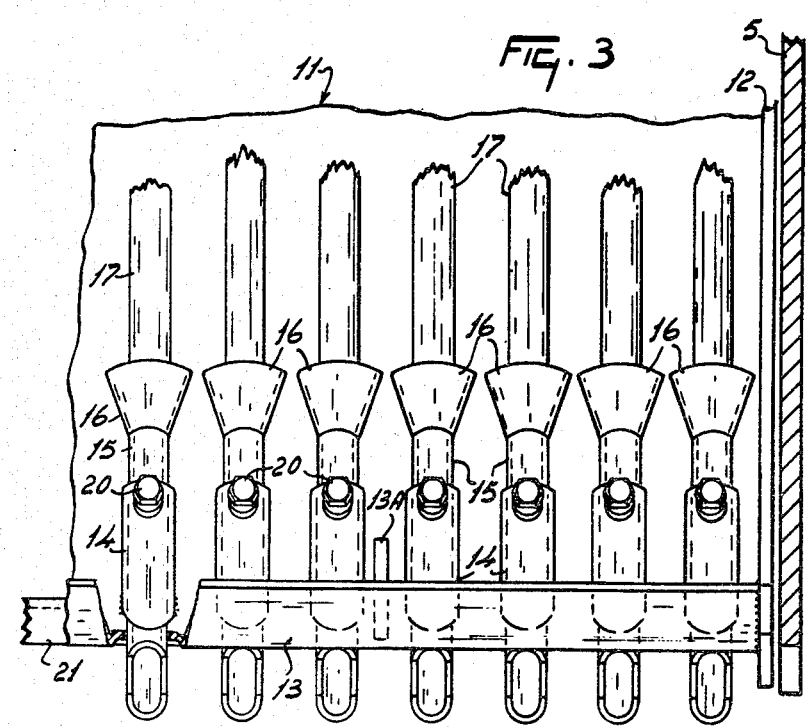

For a better understanding of the invention, and to show how the same may be carried into effect, reference will now be made, by way of example, to the accompanying drawings, in which:

FIG. 1 is a side elevation of an implement combination in accordance with the invention connected to the rear of an agricultural tractor, FIG. 2 is a part-sectional side elevation, to an enlarged scale, showing the construction and arrangement of parts that can be seen in FIG. 1 of the drawings in greater detail, and FIG. 3 is a section taken on the line III—III in FIG. 2.

Referring to the drawings, the implement combination that is illustrated therein comprises a leading soil cultivating implement and an immediately following implement for introducing material into the soil, the intended direction of operative travel of the combination being indicated by an arrow A in FIG. 1. The combination has a frame that is generally indicated by the reference 1, said frame being provided, near its front with respect to the direction A, with three parallel frame beams 2, 3 and 4 that all extend substantially horizontally in perpendicular or substantially perpendicular relationship with the direction A. The frame beam 2 is furthest advanced with respect to the direction A and is at the lowest horizontal level of the three beams whilst the beam 4 is rearmost with respect to the direction A and is at the highest horizontal level of the three beams, the beam 3 being located between the beams 2 and 4 with respect to the direction A and at a horizontal level between that of the beams 2 and 4. The beams 2, 3 and 4 are of tubular formation and circular cross-section and perpendicularly interconnect two upright side plates 5 of the combination that both extend substantially parallel to the direction A, the rearmost extremities of said two side plates 5 with respect to that direction being perpendicularly interconnected by a beam 6 of channel-shaped cross-section. Each side plate 5 has substantially parallel upper and lower edges, the leading extremity of the upper edge of each side plate 5 making an angular junction with a leading edge portion that is inclined steeply downwardly and forwardly with respect to the direction A from said junction. The lowermost end of this edge portion makes a angular junction with a further leading edge portion that is substantially vertically disposed. A substantially horizontal shaft 7 is rotatably connected to the two side plates 5 by bearings and is disposed close to the lower edges of the side plates 5, said shaft 7 being substantially midway between the frame beams 3 and 4 as measured in the direction A. The shaft 7 forms part of a rotary soil working member 8 that carries a plurality of soil working tools in the form of blades 9A of which only one is shown in FIG. 1 of the drawings. An upper, and upper rear, region of the rotary soil working member 8 is partially surrounded by a plurality of laterally spaced apart rods 9. Each rod 9 has an upper leading region that extends substantially parallel to the direction A but said rod is curved downwardly at the rear end of said region, the center of curvature being substantially coincident with the longitudinal axis of the shaft 7 which axis is also the axis of rotation of the soil working member 8. The leading ends of the laterally spaced apart rods 9 are secured to the substantially horizontal limb of a bar 10 that is of L-shaped cross-section, said bar 10 extending parallel to the frame beams 2, 3 and 4 between the side plates 5 but not being secured to those side plates at its opposite ends. In fact, as can be seen in outline in FIG. 1 of the drawings, the substantially vertical limb of the bar 10 is secured to the upper edge of a leading hood or baffle of curved configuration and said hood or baffle is pivotally connected to the frame 1 by arms that form parts of a pivotable linkage which will allow the hood or baffle, the bar 10 and the rods 9 to move upwardly and downwardly, when required, with only a few degrees of tilt.

A pivotal mounting for the leading edge of a hood or baffle 11 is carried by the side plates 5 of the frame 1 at a position substantially vertically above the shaft 7, said pivotal mounting defining a substantially horizontal axis that is substantially perpendicular to the direction A and parallel to the frame beams 2, 3 and 4. The hood or baffle 11, which is of unperforated construction, extends rearwardly with respect to the direction A away from its pivotal mounting and is then curved downwardly to merge into the upper end of a substantially flat downwardly and rearwardly inclined portion. The curved portion of the hood or baffle 11 that has just been mentioned is so shaped that the center of curvature of at least part thereof is substantially coincident with the longitudinal axis of the shaft 7. The hood or baffle 11 has opposite side plates 12 that are both of the somewhat irregular but basically quadrilateral shape that is shown in FIG. 1 of the drawings, said side plates 12 being located close to the respective side plates 5 of the frame 1 in parallel or substantially parallel relationship with those upright side plates 5. The lowermost edge of the substantially flat downwardly and rearwardly inclined portion of the hood or baffle 11 merges into the upper leading edge of a cylindrically curved portion 13 whose convex surface faces downwardly towards the ground which it will normally contact during the use of the combination. A number of strengthening plates 13A (FIGS. 2 and 3) are disposed at the concave side of the cylindrically curved portion 13 of the hood or baffle 11 and act to ensure the rigidity of that portion 13.

A plurality of obliquely inclined sleeve-like conduits 14 that are spaced apart from one another at regular intervals across the width of the hood or baffle 11 are secured to that hood or baffle at substantially the junction between the lower edge of the substantially flat downwardly and rearwardly inclined portion thereof and the upper leading edge of the cylindrically curved portion 13 thereof, each conduit 14 communicating with a corresponding hole through the hood or baffle 11 in the region thereof that has just been discussed. Each conduit 14 has a corresponding tubular outlet 15 of rectilinear or substantially rectilinear formation received slidably therein, the upper end of each outlet 15 being provided with a corresponding funnel 16. A mouth at the lowermost end of a tube 17 is disposed inside each of the funnels 16, said tubes 17 being of telescopic formation (see FIG. 1) and having their upper ends in communication with the bottom of a hopper 18 of an implement 19 (of the combination) for introducing material, such as seeds, into the soil.

The oblique disposition of each conduit 14 is such that its longitudinal axis is contained in a substantially vertical plane that is substantially parallel to the direction A, the upper end of the conduit 14 being further advanced with respect to the direction A than is the lower end thereof. Each conduit 14 is provided, at the upper end thereof and at the rear with respect to the direction A, with a set bolt 20 that can be tightened to retain the corresponding tubular outlet 15 in a desired position of longitudinal extension beneath the lowermost end of the conduit 14. It will be seen from FIGS. 2 and 3 of the drawings that, at its lowermost end which will normally project from beneath the convex side of the hood or baffle portion 13, each outlet 15 has an opening whose edge is not perpendicular to the length of the outlet 15 but that extends upwardly away from the lowermost extremity of the outlet and that subtends an angle of substantially 180° around the longitudinal axis of the outlet. The total length of each opening measured in a direction parallel to the longitudinal axis of the corresponding tubular outlet 15 is equal to substantially twice the diameter of that outlet, the latter having a circular or substantially circular cross section. Thus, as seen in side elevation (FIG. 2), each tubular outlet 15 terminates at its lower end in a tip which is disposed at the front of that outlet with respect to the direction A, at least the part of each outlet 15 that will normally project downwardly from beneath the hood or baffle portion 13 being provided with a surface layer of polytetrafluoroethylen which layer thus extends to a level above that of the opening at the lower end of each outlet 15. The polytetrafluoroethylene layers give the known advantage of that material in considerably reducing the tendency of soft earth and so on to adhere to the outlets 15. In order to prevent the hood or baffle 11 from turning too far downwardly about its pivotal mounting in a clock-wise direction as seen in FIG. 1 of the drawings, a stop 21 that will co-operate with edges of the hood or baffle side plates 12 is provided at a distance in front of the cylindrically curved portion 13 of the hood or baffle 11, said stop 21 interconnecting the side plates 5 of the frame 1 and being in the form of a bar of L-shaped cross-section arranged with the junction between the limbs of the bar uppermost so that said limbs diverge downwardly away from the junction towards the ground surface.

Towards the rear edges of the frame side plates 5 with respect to the direction A, a disc roller 27 has its central substantially horizontal shaft 29 rotatably connected to the two side plates 5, said roller 27 comprising a plurality of circular discs that are spaced apart from one another at regular intervals along the length of the shaft 29. A second disc roller 28 of smaller diameter than the roller 27 is arranged to the rear of said roller 27 with respect to the direction A with its central substantially horizontal shaft 30, also, rotatably supported by the opposite side plates 5 of the frame 1. The second roller 28 comprises circumferentially toothed discs and it is not disposed wholly to the rear of the roller 27 with respect to the direction A but is so arranged that, as seen in side elevation (FIG. 1), the discs that are regularly spaced apart from one another along its central shaft 30 overlap, and thus move between, the discs that are angularly spaced apart from one another along the central shaft 29 of the roller 27. The shafts 29 and 30 project through one of the two side plates 5, the projecting portions being provided with sprocket wheels that are drivingly interconnected by a transmission chain 33. The sprocket wheels that are carried by the shafts 29 and 30 have diameters that are in the same ratio as the diameters of the corresponding rollers 27 and 28, the sprocket wheel carried by the shaft 30 thus being the smaller. A second sprocket wheel is carried by the portion of the shaft 29 that projects beyond one of the side plates 5 of the frame 1 and this second sprocket wheel is drivingly connected to the sprocket wheel 35 by a transmission chain 34. The sprocket wheel 35 is secured to one end of a substantially horizontal shaft 36 that extends through the hopper 18 between the side walls 5 of the frame 1 to act as part of a flow control or dosing mechanism of the implement 19 that controls the rate at which seeds or other material are fed from the hopper 18 to the tubes 17 during operative progress of the combination in the direction A.

The projecting portion of the shaft 29 is provided with a one-way drive mchanism 36A whose housing is connected by a lug 36B and a bolt or like fastening to the neighbouring frame side plate 5. The one-way drive mechanism 36A may be of a construction that is known per se and may comprise, for example, a pawl and ratchet or, advantageously, a one-way sprag clutch. Whatever the form of the known one-way drive mechanism 36A, it is so arranged that the disc roller 27 can rotate in an anti-clockwise direction as seen in FIG. 1 of the drawings but cannot rotate to any significant extent, if at all, in a clockwise direction as seen in that Figure. Since the second disc roller 28 is coupled to the roller 27 by way of the transmission chain 33, the restriction imposed by the one-way drive mchanism 36A applies equally to the second disc roller 28.

A second hopper 37 is arranged between the side plates 5 of the frame 1 just in front of the rear frame beam 6 and, when as will often be the case, the hopper 18 is to be filled with seeds, the second hopper 37 advantageously contains powdered or granular fertiliser. The second hopper 37 is located at substantially the same horizontal level as is the leading first hopper 18 and it contains a rotary flow control or dosing mechanism which communicates with a transversely extending outlet at the bottom of the hopper. Said mechanism has a stub shaft 38 at one end which projects through one of the side walls 5 of the frame 1 to carry a sprocket wheel 39. The sprocket wheel 39 is driven from a sprocket wheel (not visible) that is alongside the sprocket wheel 35 on the shaft 36 by way of a transmission chain 40. The transmission chains 33, 34 and 40 and the sprocket wheels with which they co-operate are surrounded by a protective casing 41.

One end of the central shaft 7 of the rotary soil working member 8 projects through one of the side plates 5 of the frame 1 and into a protective casing 42 where it is provided with a sprocket wheel 43 that is desirably, but not essentially, of multiple construction. A transmission chain 44 which will be of ganged construction if the sprocket wheel 43 is of multiple formation places said sprocket wheel 43 is driven connection with a smaller single or multiple sprocket wheel 45 carried at one end of a substantially horizontal shaft 46 that extends substantially perpendicular to the direction A through said one side wall 5 of the frame 1 and into a substantially centrally mounted gear box 47 of the combination. The gear box 47 has a rotary input shaft 50 that extends substantially horizontally parallel to the direction A with its leading splined or otherwise keyed end projecting forwardly from said gear box. The rearmost end of the shaft 50 and the rearmost end of a shaft of the gear box 47 that is parallel thereto but not visible in the drawings both extend through the back of said gear box 47 into a change-speed gear 49 that is mounted at the rear of the gear box. The spaced but parallel ends of the two shafts that project into the change-speed gear 49 are splined or otherwise keyed for co-operation with the matchingly splined or otherwise keyed hubs of pairs of straight-toothed or spur-toothed pinions (not visible) that are of different sizes. The particular pair of pinions that is chosen for use in the change-speed gear 49, and the arrangement thereof that is adopted on said shaft ends, dictates the transmission ratio between the rotary input shaft 50 of the gear box and the shaft 46 that affords the output of the gear box, the latter shaft being in driven communication with the shaft that is parallel to the shaft 50 by way of bevel pinions that are not visible in the drawings. Thus, depending upon the pinions that are employed in the changespeed gear 49, the soil working member 8 can be rotate at a higher or lower speed in response to the substantially constant speed of rotation applied to the forwardly projecting end of the rotary input shaft 50. As can be seen in outline in FIG. 1 of the drawings, said input shaft 50 is intended to be placed in driven connection with the rear power take-off shaft of an agricultural tractor or other operating vehicle through the intermediary of a telescopic transmission shaft that is of a construction which is known per se having universal joints at its opposite ends. A substantially centrally mounted coupling member that is generally indicated by the reference 51 is secured to the leading transverse frame beams 2 and 3 and is constructed and arranged for co-operation with the three-point lifting device or hitch at the rear of an agricultural tractor or other operating vehicle in the manner that can be seen in outline in FIG. 1 of the drawings. A bracket at substantially the top of the coupling member 51 is connected to two spaced locations on the rear transverse frame beam 4 by a pair of tie beams 52 that diverge downwardly and rearwardly with respect to the direction A from said bracket to the frame beam 4.

In the use of the implement combination that has been described, its coupling member 51 is connected to the three-point lifting device or hitch at the rear of an agricultural tractor or other operating vehicle and the forwardly projecting end of the rotary input shaft 50 of the gear box 47 is placed in driven connection with the rear power take-off shaft of the same agricultural tractor or other operating vehicle by way of the known telescopic transmission shaft that has been mentioned above. If required, the change-speed gear 49 is adjusted before work commences and also, if required, the tubular outlets 15 are adjusted relative to the conduits 14 employing the set bolts 20. These adjustments will be made having regard to the nature and condition of the soil that is to be cultivated and the size and germination requirements of the seeds that are to be sown from the hopper 18. If required, the second hopper 37 is provided with a supply of powdered or granular fertiliser and/or with a supply of pesticide or some other material that may advantageously be supplied to the surface of the worked soil. As the implement combination moves operatively in the direction A, the soil working member 8 is caused to revolve around the axis of its central shaft 7 in the direction idnicated by an arrow in FIG. 1 of the drawings which direction, it will be noted, is such that the blades 9A thereof move forwardly through the soil with respect to the direction A thus tending to move the whole combination rearwardly over the ground in a direction opposite to the direction A. The soil that is displaced by the blades 9A is moved upwardly in front of the shaft 7 and rearwardly over the top of that shaft into contact with the laterally spaced apart rods 9. Stones, hard lumps of soil, root debris and the like that cannot pass through the gaps between the rods 9 slide downwardly along those rods and fall to the bottom of the broad furrow that has been excavated by the blades 9A at a location in advance of the transverse stop 21. Finely divided soil, on the other hand, passes readily through the gaps between the rods 9 and is thrown against the forwardly facing surface of the hood or baffle 11 which deflects said soil downwardly into the furrow excavated by the blades 9A to fall on top of, and cover, any stones and the like that were previously arrested by the rods 9. The cylindrically curved portion 13 of the hood or baffle 11 slides over the ground surface in substantially the position shown in FIGS. 1 and 2 of the drawings and performs a smoothing effect upon that surface. The grooves that are formed by the lower ends of the tubular outlets 15 during their passage through the finely divided soil in which the seeds from the hopper 18 are sown are, of course, closed to a large extent, if not wholly, by the downwardly directed convex surface of the hood or baffle portion 13 which immediately follows said outlets 15 in the direction A.

Both the roller 27 and the roller 28 are revolved by their contact with the ground surface as the combination moves forwardly in the direction A and this motion is transmitted to the shaft 36 and stub shaft 38 by the transmission chains 34 and 40 and the sprocket wheels 35 and 39. Thus, seeds are released from the hopper 18 into thw tubes 17 at a speed which is proportional to the speed of travel of the combination in the direction A and any fertiliser or other material that is contained within the second hopper 37 is released to fall onto the surface of the worked soil at a speed which is also proportional to the speed of travel in the direction A. The seeds pass from the telescopic tubes 17 via the funnels 16 into the outlets 15 and leave the rearwardly directed openings at the lowermost ends of those outlets to be left in the finely divided surface layer of the soil that has been worked by the member 8. In prior art implement combinations that are basically similar to the combination that has been described but that are not in accordance with the present invention, there is a strong tendency, when the central shaft 7 of the rotary soil working member 8 is first driven at the commencement of a period of operation when the combination is not actually moving forwards in the direction A, for tools equivalent to the blades 9A of the combination that has been described to cause the whole combination and often the tractor or other operating vehicle to which the combination is connected to move rearwardly through a short distance in a direction opposite to the direction A. This has the result that soil is pushed forcibly into rearwardly directed openings of coulters or other outlets that are equivalent to the tubular outlets 15 of the combination that has been described with the result that many of said openings become blocked with soil and will not allow seeds or other material to pass therethrough until a tedious and awkward clearing operation has been undertaken. In the implement combination that has been described in accordance with the pesent invention, any tendency for that combination to move rearwardly with respect to the direction A is strongly opposed by the discs of the roller 27 and the circumferentially toothed discs of the second roller 28 since the one-way drive mechanism 36A prevents both of those rollers 27 and 28 from revolving about the axes of their respective central shafts 29 and 30 to any significant extent inclockwise directions as seen in FIG. 1 of the drawings. The mechanism 36A does not, of course, interfere in any way with normal rotation of both of the rollers 27 and 28 when the combination moves forwardly in the direction A. Blockage of the openings of any of the tubular outlets 15 thus occurs only very rarely, if ever, the particular shapes of the rearwardly directed openings and the surface layers of polytetraflyoroethulene which are carried at the lower ends of the outlets 15 also contributing to the avoidance of blockages.

The whole implement combination can be raised clear of contact with the ground for inoperative transport purposes by the three-point lifting device or hitch of the agricultural tractor or other operating vehicle to which the coupling member 51 is connected and, under such circumstances, the hood or baffle 11 is prevented from turning too far downwardly about its pivotal mounting in the frame 1 by the transverse stop 21 which lies in the path of downward movement of edges of the hood or baffle side plates 12. It is noted that, during the operation of the combination, the transverse stop 21 acts as a leveller co-operating principally with the stones, coarse soil and so on that fall to the bottom of the furrow excavated by the blades 9A before the lighter finely divided soil that has passed between the rods 9 has dropped back into that furrow.

Although various features of the implement combination that has been described and/or that are illustrated in the accompanying drawings will be set forth in the following claims as inventive features, it is emphasised that the invention is not necessarily limited to those features.

What we claim is:

1. An implement combination comprising a frame movable over the ground and a soil working member rotatably mounted on a shaft supported by said frame, said member being rotatable about an axis defined by said shaft, and said shaft extending horizontally and transverse to the direction of travel, driving means connected to rotate said member forwardly through the soil in the normal direction of travel, a screening hood pivoted to the frame and extending rearwardly over said member to a rear curved portion that rides along the ground and performs a smoothening effect on the ground surface, ground-driven roller means mounted on said frame and positioned to the rear of said hood, a material-dispensing device comprising a hopper in communication with downwardly extending outlet means with openings located in advance of said roller means, said openings being located adjacent and below said curved portion on the rear of said outlet means and the outlet means normally extending below the soil worked by said member to dispense material into the soil during operation, and means for preventing said openings from becoming blocked by soil during the rotation of said soil working member including at least one roller of said roller means journalled to the frame by one-way drive means and said roller being restricted by said one-way drive means to forward movement only with respect to said direction.

2. A combination as in claim 1, wherein said outlet means comprises a plurality of elongated conduits having respective openings directly below said curved portion, rotatable flow control means in said hopper that controls the rate of material feed to said conduits, said control means being driven by transmission means interconnecting the control means to said one-way drive means.

3. A combination as claimed in claim 2, wherein said roller means comprises two rollers arranged one behind the other, the forward roller being journalled to the frame by said one-way drive means and further transmission means interconnecting the rear roller to said one-way drive means.

4. A combination as claimed in claim 2, wherein each opening subtends substantially 180° at the longitudinal axis of the corresponding conduit and the conduit is substantially circular.

5. A combination as claimed in claim 4, wherein said opening extends lengthwise of that conduit for a distance equal to about twice the diameter thereof.

6. A combination as claimed in claim 2, wherein said conduits are supported by said hood which partially surrounds said soil working member.

7. A combination as claimed in claim 6, wherein said conduits extend obliquely downwardly and rearwardly with respect to the direction of travel and pass through said curved position.

8. A combination as claimed in claim 7, wherein said conduits are carried by said hood and the upper ends of the conduits are supported on respective outlet elements.

9. A combination as claimed in claim 8, wherein said conduits are upwardly and downwardly adjustable telescopically in their outlet elements.

10. A combination as claimed in claim 6, wherein said hood is pivotally connected to said frame.

11. A combination as claimed in claim 10, wherein a stop is connected to the frame adjacent said hood and said stop prevents the hood from turning too far downwardly about its pivotal connection when the combination is raised to an inoperative position.

12. A combination as claimed in claim 11, wherein said stop is a bar that extends transverse, to the direction of operative travel of the combination, said bar being positioned as a leveller when the combination is in operation.

* * * * *